(No Model.) 2 Sheets—Sheet 1.
R. PICKWELL.
RECORDING COMPASS.
No. 272,765. Patented Feb. 20, 1883.
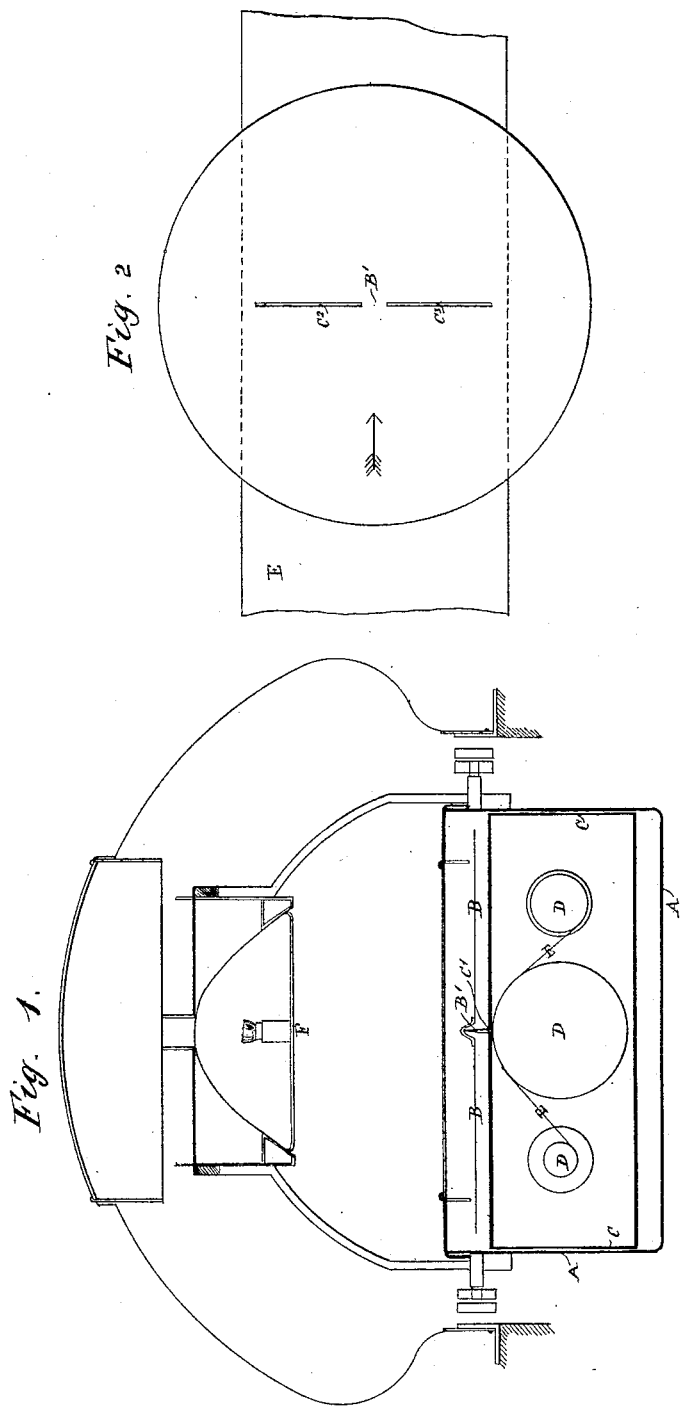
Witnesses:
Alfred J. Boult
Inventor:
Robert Pickwell (No Model.) 2 Sheets—Sheet 2.
R. PICKWELL.
RECORDING COMPASS.
No. 272,765. Patented Feb. 20, 1883.
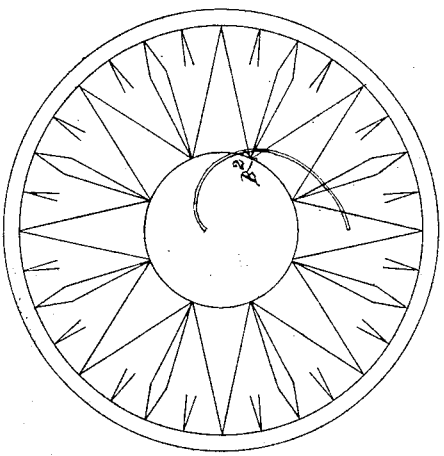
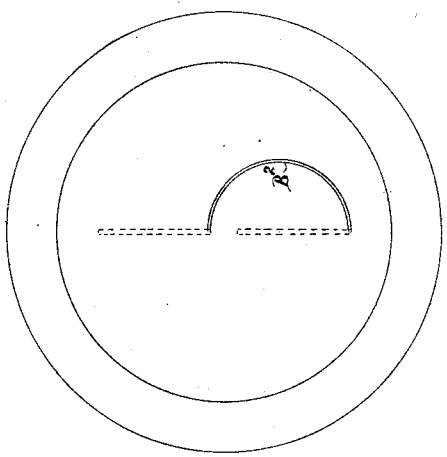
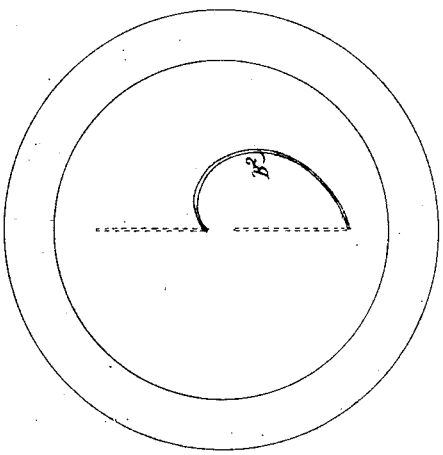
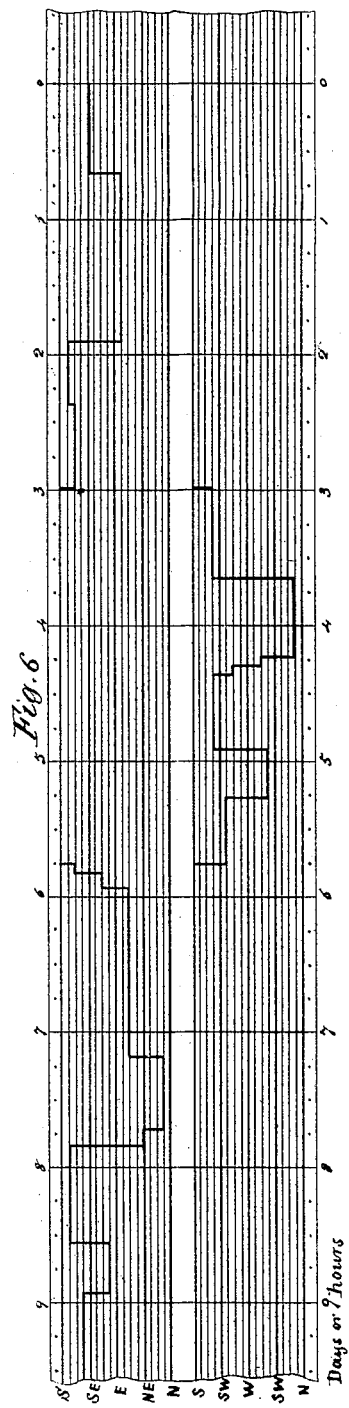
Witnesses:
Alfred J. Boult
Inventor:
Robert Pickwell

UNITED STATES PATENT OFFICE.

ROBERT PICKWELL, OF KINGSTON-UPON-HULL, COUNTY OF YORK, ENGLAND.

RECORDING-COMPASS.

SPECIFICATION forming part of Letters Patent No. 272,765, dated February 20, 1883.

Application filed April 29, 1882. (No model.) Patented in England January 18, 1882, No. 251.

*To all whom it may concern:*

Be it known that I, ROBERT PICKWELL, a subject of the Queen of England, residing at Kingston-upon-Hull, in the county of York, Kingdom of Great Britain, civil engineer, have invented new and useful Improvements in Recording-Instruments, chiefly for use on board ship, (for which I have obtained provisional protection in Great Britain on the 18th of January, 1882, No. 251,) of which the following is a specification.

My invention has for its object the application of the mariner's compass or magnetic needle to the purpose of automatically making a diagram or register showing the compass direction or course in which the ship or other moving body to which it is applied is traveling. I do not confine the use of this instrument to ships only, as it is obviously applicable to other moving bodies; but I will describe it as applied to a ship. By this invention a record or register of the compass-course of a ship from the time she leaves port till she arrives at her destination can be kept, and, being continuous and automatic, it records the course and changes thereof during the whole or portions of the voyage, and in case of a casualty to the vessel at sea the bearing of her head at the time would be shown. I employ either stationary or moving pieces or strips of sensitized paper, or their equivalent, or a traveling band actuated in any suitable manner, but preferably by a train of clock-work in such a way that a ray of light passing through or onto the compass-card photographs the diagram, which is thus marked or traced out by a pencil of natural light or artificial light, and the compass card or paper is not touched by any marking-instrument whatever. The train of clock-work may be employed either for moving the paper or for moving the opening through which the light passes onto the paper, so as to represent a uniform motion per hour of the lines traced on the diagram. Suitable provision is made for inspecting or ascertaining whether the train of wheels is in motion, and also for consulting the diagram itself at any time or for removing the band or sheets when required. I prefer to arrange so that this compass may be used either as the steering, standard, or bridge compass, and that the officer in charge may have access to the diagram or not during the voyage, as may be desirable.

The details may of course be varied without departing from the spirit of this invention. Thus the precise ruling or marking of the diagram-paper is not material, nor is the form of the case, tube, or chamber containing the sensitized medium essential, so long as all the essential particulars of the course are clearly set forth by the aid of a pencil of light acting in conjunction with the compass card or needle.

In the accompanying drawings, one method only of applying the invention is shown.

In these drawings, like letters represent like parts.

Figure 1 is a sectional elevation of a binnacle-dome, showing the apparatus and the compass card and lamp. Fig. 2 is a plan showing the slits in the case-tube or equivalent beneath the compass-card, which is removed for clearness. Figs. 3 and 4 show the compass-card with two arrangements of the curved slit or opening in it. Fig. 5 is a view of the compass-card with the points marked on it, and Fig. 6 shows part of a strip of the sensitized paper with diagrams upon it.

A is an ordinary compass-bowl; B, the compass-card suspended from the center at B', as usual; C, the metal box-tube or equivalent containing the clock-work D of any construction and arrangement suitable to propel either a continuous band or separate pieces of sensitized paper, E, exposed to the light at C', Fig. 1, by means of the two narrow slits $C^2$ and $C^3$ in the top of the case-tube or equivalent, which is otherwise light-proof.

F is a lamp, for use when daylight is not available.

$C^2$ and $C^3$, Fig. 2, are fine slits in the top of case-tube or equivalent C, and at right angles to the course of the traveling band E.

Fig. 3 shows the compass-card in place above the case-tube or equivalent, the slits $C^2$ $C^3$ being dotted in beneath. The form of slit $B^2$ in the compass-card itself may be varied, so long as its range causes the point where it crosses the underneath slits, $C^2$ and $C^3$, to traverse the entire length of these slits.

Figs. 3, 4, and 5 show two forms of slit, that in Figs. 3 and 5 being preferable, because they are so divided and set out that the lines representing the thirty-two points of the compass upon the band E can be evenly spaced, as shown in Fig. 6. This curve is easily set out by marking upon a line drawn from the center of the card to the due N point, the sixteen divisions of one hemisphere of the traveling band. These division are then marked upon the radii from the center to the sixteen corresponding points upon the card, and thus give the proper curve, as will be well understood. This slit B² is so arranged that it is always across one of the slits C² or C³, but never across both at the same time, except at the extremities, and its range is such that in one complete revolution of the card the point of crossing traverses the whole length of the slits underneath, and a pencil of light passes through both slits at the point of crossing, and as this point changes its position over the traveling band of paper it photographs a black mark wherever the crossing-point may be, and, as the paper is constantly traveling, longitudinal and cross lines are produced, the position of which upon the paper corresponds with the compass-bearing of the ship's head.

Fig. 6 shows a diagram, as produced by the above-described arrangement, the lines marked NNE to S and SW to N corresponding with the points of the compass, and the dots on the edge of the paper representing hours or days, as desired. The thick diagram-line represents the black mark as photographed, and shows the compass-bearing of the ship's head, its changes, and the time it remained on each course. The diagram-lines on the upper half of the paper show courses to the eastward of N and S. The lines upon the lower half of the paper show courses to the westward of N and S.

Having thus described my invention, I claim—

1. The herein-described appliances for automatically obtaining diagrams of a ship's course by means of photography, which consist in the combination of a sensitized strip of paper contained in a dark camera, a mariner's compass, the card of which is provided with a slit, B², and an opaque disk interposed between the card and sensitized paper, having slits C² C³, all arranged to operate substantially as and for the purposes specified.

2. The herein-described appliances for automatically obtaining a diagram of a ship's course by means of photography, which consist of a traveling strip of sensitized paper contained in a dark camera, a mariner's compass, the movable card of which is provided with a slit, B², in combination with a stationary cover for said camera, interposed between the compass-card and sensitized paper, and having the slits C² C³, substantially as and for the purposes specified.

3. The combination, in an apparatus of the class described, of a mariner's compass, its movable card provided with a slit, B², a dark camera containing a continuous strip of sensitized paper arranged to continuously travel by unwinding from one roll onto another, mechanism for moving the paper, and an opaque plate or disk provided with slits C² C³, interposed between the camera and compass-card, all arranged and co-operating substantially as and for the purposes specified.

ROBERT PICKWELL.

Witnesses:
BERNH. DUKES,
JOHN DEAN.